United States Patent
Kabs et al.

(10) Patent No.: US 9,859,769 B2
(45) Date of Patent: Jan. 2, 2018

(54) END PLATE FOR AN ELECTRIC MACHINE, ELECTRIC MACHINE AND METHOD FOR ASSEMBLING AN ELECTRIC MACHINE

(71) Applicants: Gino Kabs, Landikon (CH); George Kleynhans, Buelach (CH); Markus Dettwyler, Pfaeffikon (CH); Marcel Vetter, Zuerich (CH)

(72) Inventors: Gino Kabs, Landikon (CH); George Kleynhans, Buelach (CH); Markus Dettwyler, Pfaeffikon (CH); Marcel Vetter, Zuerich (CH)

(73) Assignee: MAN Diesel & Turbo SE, Augsburg (DE)

( * ) Notice: Subject to any disclaimer, the term of this patent is extended or adjusted under 35 U.S.C. 154(b) by 124 days.

(21) Appl. No.: 14/404,264

(22) PCT Filed: May 28, 2013

(86) PCT No.: PCT/EP2013/060971
§ 371 (c)(1),
(2) Date: Nov. 26, 2014

(87) PCT Pub. No.: WO2013/178634
PCT Pub. Date: Dec. 5, 2013

(65) Prior Publication Data
US 2015/0145362 A1    May 28, 2015

(30) Foreign Application Priority Data
May 31, 2012   (DE) .................. 10 2012 209 134

(51) Int. Cl.
*H02K 5/15* (2006.01)
*H02K 7/09* (2006.01)
(Continued)

(52) U.S. Cl.
CPC .................. *H02K 7/09* (2013.01); *H02K 5/15* (2013.01); *H02K 15/02* (2013.01); *H02K 15/16* (2013.01);
(Continued)

(58) Field of Classification Search
CPC .. H02K 7/09; H02K 5/16; H02K 7/08; H02K 15/02; H02K 15/16; H02K 5/15;
(Continued)

(56) References Cited

U.S. PATENT DOCUMENTS 3,628,884 A * 12/1971 Mierley, Sr. ............ F01D 25/26
                                                         29/464
3,714,705 A *  2/1973 Lewis .................. H02K 5/1672
                                                         29/434
(Continued)

FOREIGN PATENT DOCUMENTS

DE        108 806      3/1900
DE       11 25 066     3/1962
(Continued)

OTHER PUBLICATIONS

Machine Translation of DE-1125066-B.*

*Primary Examiner* — John K Kim
(74) *Attorney, Agent, or Firm* — Cozen O'Connor

(57) ABSTRACT

An end plate for an electric machine includes: a bearing receptacle in which a magnetic bearing which is configured for rotatably mounting a rotor of the electric machine can be accommodated; and a radially outwardly pointing circumferential contour on which a number of at least three supporting elements are provided, which supporting elements each protrude radially beyond the circumferential contour by a determined protruding amount, with the result that the supporting elements define a discontinuous external circumferential contour of the end plate. The respective (Continued)

protruding amounts of the support elements are dimensioned such that the end plate can be fitted in by making a center of the magnetic bearing correspond to at least one of a geometric longitudinal axis of the electric machine and a magnetic longitudinal axis of the electric machine.

9 Claims, 10 Drawing Sheets

(51) Int. Cl.
*H02K 15/16* (2006.01)
*H02K 15/02* (2006.01)
*H02K 5/16* (2006.01)

(52) U.S. Cl.
CPC ......... *H02K 5/161* (2013.01); *H02K 2213/09* (2013.01); *Y10T 29/49011* (2015.01)

(58) Field of Classification Search
CPC ........................ H02K 5/161; H02K 2213/09; F16C 32/0442; F16C 39/02; F16C 19/507; F16C 27/066; Y10T 29/49011
USPC ............................... 310/90.5, 89, 90; 29/597
IPC ........................ H02K 5/15,7/09, 15/02
See application file for complete search history.

(56) References Cited

U.S. PATENT DOCUMENTS

| | | | | |
|---|---|---|---|---|
| 4,012,083 A | * | 3/1977 | Habermann | F16C 32/0474 310/90.5 |
| 4,112,582 A | * | 9/1978 | Beckershoff | F01D 25/24 33/655 |
| 4,686,403 A | * | 8/1987 | Hackstie | H02K 5/1672 310/90 |
| 5,214,585 A | * | 5/1993 | Ehrich | F01D 5/027 700/279 |
| 6,224,332 B1 | * | 5/2001 | Leach | F01D 25/243 415/126 |
| 6,457,936 B1 | * | 10/2002 | Leach | F01D 25/26 415/138 |
| 2008/0069489 A1 | * | 3/2008 | Drake | F16C 33/723 384/489 |
| 2009/0232651 A1 | * | 9/2009 | Ballard, Jr. | F01D 25/246 415/220 |
| 2012/0099990 A1 | * | 4/2012 | Fretwell | F01D 25/246 416/131 |
| 2012/0181887 A1 | * | 7/2012 | Schubert | F16C 32/0442 310/90.5 |

FOREIGN PATENT DOCUMENTS

| | | | | |
|---|---|---|---|---|
| DE | 1125066 B | * | 3/1962 | ............. F16C 23/06 |
| DE | 2 73 924 | | 11/1989 | |
| DE | 10 2009 001 9 | | 9/2010 | |
| DE | 10 2009 001 948 | | 9/2010 | |
| DE | 10 2009 001 948 A1 | | 9/2010 | |
| DE | 10 2009 019 593 A1 | | 12/2010 | |
| DE | 102009019593 A1 | * | 12/2010 | ............. F16C 33/12 |
| EP | 0 412 954 | | 2/1991 | |
| JP | 2007-325336 | | 12/2007 | |

* cited by examiner

END PLATE FOR AN ELECTRIC MACHINE, ELECTRIC MACHINE AND METHOD FOR ASSEMBLING AN ELECTRIC MACHINE

CROSS-REFERENCE TO RELATED APPLICATIONS

This is a U.S. national stage of application No. PCT/EP2013/060971, filed on 28 May 2013, which claims priority to the German Application No. 10 2012 209 134.3, filed 31 May 2012, the content of both incorporated herein by reference.

BACKGROUND OF THE INVENTION

1. Field of the Invention

The invention relates to an end plate for an electric machine, an electric machine equipped with such an end plate and a method for assembling the electric machine.

2. Description of the Related Art

From DE 10 2009 001 948 A1 an end plate for an electric machine is known, which comprises an inner ring as a bearing receptacle, in which a bearing equipped for rotatably mounting a rotor of the electric machine can be accommodated, and an outer ring as a radially outwardly pointing outer circumferential contour, which for radially supporting the end plate can be fitted under preload into an inner circumference of a stator housing of the electric machine.

From DE 10 2009 019 593 A1 is evident an electric machine with a stator comprising a stator housing, a rotor arranged in an inner circumference of the stator housing and an end plate, in which a bearing for rotatably mounting the rotor is accommodated in a bearing receptacle. On the end plate, an active magnetic bearing is provided, by way of which in the case of an energized magnetic bearing a rotor shaft of the rotor is rotatably mounted radially. A catch bearing of the active magnetic bearing comprises an inner ring which encloses the rotor shaft and which has an inner diameter that is greater by a predetermined dimension than an outer diameter of the rotor shaft, so that in the case of an energized magnetic bearing an annular gap between rotor shaft and inner ring is formed and in the case of non-energized magnetic bearing the rotor shaft rests on the inner ring on the inside.

The winding of an electric machine, such as of an electric motor, naturally generates forces which ideally are substantially converted completely into a rotational moment on the rotor that can be completely utilized at an output (e.g., a coupling) of the electric machine. In reality, however interference forces also act on the rotor, which can impair the optimal rotation of the same. These interference forces can be created when individual phase windings have slightly different electric characteristics, the lamination has local variations and/or the rotor does not rotate precisely concentrically in the stator. The latter can become manifest in that periodical force excitations act on the rotor with a multiple of the electric frequency. In the specialist literature, this phenomenon is known as "unbalanced magnetic pull" (UPM).

Investigations regarding this phenomenon are published for example in "EFFECTS OF CONSTANT UNBALANCED MAGNETIC PULL TO THE VIBRATION BEHAVIOURS OF TURBO MACHINERY", Zhemin Cai and Ningsheng Feng, ICSV15, 15th International Congress on Sound and Vibration, 6-10 Jul. 28, Daejeom, Korea and in "SIMULATION OF THE EFFECTS OF THE UNBALANCED MAGNETIC PULL IN 4-POLE SLIM GENERATORS", P. Pennacchi and L. Frosini.

The abovementioned phenomenon causes undesirable vibrations in the rotor shaft (rotor dynamics) and thus potentially throughout the electric machine. This can constitute a serious problem in the case of high-frequency motors with small air gaps in the electric machine.

SUMMARY OF THE INVENTION

An object of the invention is to provide an end plate for an electric machine, an electric machine and a method for assembling an electric machine, so that undesirable eccentricities of the rotor and thus vibrations can be avoided.

A realization of the invention is that in order to avoid UP-based vibrations of the rotor one should endeavor to arrange the rotor as concentrically as possible relative to the stator. The concentricity with respect to the magnetic central axis or longitudinal access of the electric machine and/or the geometrical central axis or longitudinal axis of the electric machine is decisive. The magnetic longitudinal axis and the geometrical longitudinal axis can coincide but not necessarily so.

Since production and assembly tolerances have to be always expected, it cannot be prevented in reality that the center of a magnetic bearing mounting the rotor accommodated in the end plate does not exactly coincide with the magnetic longitudinal axis of a stator winding of the stator. Since this magnetic longitudinal axis of the stator winding in first approximation substantially coincides with a longitudinal center axis of an inner circumference or inner diameter of a stator housing of the electric machine, and thus the geometrical longitudinal axis of the electric machine, it is thus advantageous to primarily align the center of the magnetic bearing according to the inner circumference of the stator housing or the geometrical longitudinal axis of the electric machine. However, this alignment is ideally made with respect to the magnetic longitudinal axis of the electric machine.

According to an aspect of the invention, the end plate for the electric machine, such as in particular an electric motor or an electric generator, therefore comprises at least the following elements. A bearing receptacle, in which a magnetic bearing equipped for rotatably mounting a rotor of the electric machine, which is preferably configured as an active magnetic bearing with associated catch bearing, can be accommodated; a radially outwardly pointing circumferential contour, on which a number of at least three support elements—also called shimming pads—is provided, each of which protrude radially beyond the circumferential contour by a predetermined protruding amount so that the support elements define a discontinuous outer circumferential contour of the end plate; wherein the respective protruding amounts of the support elements are dimensioned so that the end plate can be fitted in by making a center of the magnetic bearing coincide with a geometrical longitudinal axis of the electric machine and/or a magnetic longitudinal axis of the electric machine.

By specifically influencing or adjusting the respective protruding amounts, production and assembly tolerances can be offset. Because of the fact that following the fitting—in of the outer circumferential contour the center of the magnetic bearing coincides with the geometrical longitudinal axis and/or magnetic longitudinal axis of the stator of the electric machine, the rotor is consequently arranged optimally concentrically to the stator housing, as a result of which periodic force excitations and concomitant undesirable vibrations of the rotor can be largely reduced or avoided.

According to a preferred embodiment of the end plate according to the invention, the support elements are each mounted radially adjustably on the circumferential contour so that the respective protruding amounts of the support elements can be changed, i.e., can be specifically influenced or adjusted time and again. Such a radial adjustment can for example be realized with a thread-controlled self-locking and/or separately lockable sliding guide or with exchangeable shims.

According to a further preferred embodiment of the end plate according to the invention, each support element has a contact body located radially outside for contacting the inner circumference of the stator housing and an individual number of shims radially shimmed under towards the inside, wherein each shim has a certain radial thickness dimension. A shim or multiple shims of the same or different radial thickness dimension can be placed under the contact body. This configuration of the invention is particularly robust and can be easily and cost-effectively realized.

According to yet another preferred embodiment of the end plate according to the invention, the support elements are arranged in respective recesses, which in each case extend from the circumferential contour radially to the inside and circumferentially of the end plate. In the recesses, fasteners—for example the screw heads of screws—can be advantageously accommodated so that these do not take up any additional space radially.

According to yet a further embodiment of the end plate according to the invention, the support elements are arranged in two groups of support elements distributed about the circumferential contour, wherein the support elements of a first group of these two groups are in engagement with the inner circumference of the stator housing in order to fit in the end plate relative to the stator housing, and wherein the support elements of a second group of these two groups are in engagement with the inner circumference of a connecting housing in order to fit in the connecting housing with respect to the stator housing independently of the end plate. Preferentially, the support elements for this purpose each have a support surface located radially outside, which is formed stepped axially to the end plate, wherein the stepping of a first group with at least three support elements radially rises in a first axial direction as far as to the respective protruding amount and the steps of a second group with at least three support elements radially rises as far as to the respective protruding amount in a second axial direction, and wherein within each of the two groups the support elements are arranged with a defined angular spacing from one another preferentially symmetrically about the circumferential contour. This configuration is advantageous for electric machines in which a connecting housing is flanged to the stator housing.

Through the opposite stepping of the two groups the support surfaces of one of the two groups, preferably upon the assembly of the end plate, first come into contact with the inner circumference of the stator housing so that any adjustment of the protruding amounts of this group can be carried out if necessary. Through the opposite stepping, the support surfaces of the other one of the two groups only come into contact with the inner circumference of the connecting housing during the further assembly of the connecting housing. Since the protruding amounts of the first group are matched, the same provides the desired centering of the end plate so that the protruding amounts of the second group can be utilized for centering the connecting housing independently of the centering of the end plate.

According to the first aspect of the invention, an electric machine is additionally provided, as in particular an electric machine embodied as electric motor or as electric generator, which comprises a stator comprising a stator housing, a rotor arranged in an inner circumference of the stator housing and an end plate according to the first aspect of the invention. Details of the end plate according to the first aspect of the invention are described above.

According to an embodiment of the electric machine according to the invention, the rotor is radially mounted by way of magnetic bearings arranged on both sides of the electric machine, which in each case are incorporated in the electric machine via an end plate according to the invention.

The magnetic bearings can be passive magnetic bearings and active magnetic bearings.

In the event of a failure of a magnetic bearing system with active magnetic bearings, catch bearings are provided which catch the rotor.

Magnetic bearings and catch bearings of such active magnetic bearings are generally available as a preassembled unit.

Preferentially, roller bearings are employed as catch bearings. However, sliding bearings can also be employed as catch bearings.

If embodied as roller bearings, the catch bearings should not co-rotate during normal operation. For this reason, there is an air gap of a few tenths of a millimeter between the inner ring of the catch bearings and the fast-rotating rotor. This air gap is the closest gap of the entire rotor shaft since in the case of a rotor crash falling off the rotor into structures other than the catch bearings is to be prevented. For this reason, the magnetic bearings hold the rotor in the center of these catch bearings during normal operation.

According to a preferred embodiment of the electric machine according to the invention, an active magnetic bearing is provided on the end plate, via which on energizing the magnetic bearing a rotor shaft of the rotor is rotatably mounted radially, wherein the catch bearing of the active magnetic bearing has an inner ring which encloses the rotor shaft and which has an inner diameter that is greater by a predetermined dimension than an outer diameter of the rotor shaft, so that with energized magnetic bearing an annular gap is formed between rotor shaft and inner ring of the catch bearing and with non-energized magnetic bearing the rotor shaft rests on the inner ring of the catch bearing inside.

According to a further preferred embodiment of the electric machine according to the invention, the same additionally comprises a control device for electrically activating the active magnetic bearing so that with energized magnetic bearing an axis of rotation of the rotor shaft coincides with the center of the magnetic bearing.

Since, as explained above, production and assembly tolerances always have to be expected, it cannot be prevented in reality that the center of the magnetic bearings and in the case of active magnetic bearings with a preassembled unit of magnetic bearing and catch bearing, the catch bearings do not exactly coincide with the magnetic central axis or longitudinal axis of the stator winding either. An offset (axes not aligned) however, as explained above, results in the undesirable phenomenon of forces periodically acting on the rotor caused by UPM. Remedy is provided by the radially adjustable end plate according to the invention, wherein the adjustment is preferably realized during the assembly process through precise measuring. The center of the magnetic bearing and in the case of active magnetic bearings also the catch bearing in this case is adjusted with the center of the stator winding, which in first approximation is performed via the alignment according to the inner circumference or inner diameter of the stator housing or the geometrical longitudinal axis of the stator, preferentially according to the magnetic longitudinal axis of the stator.

According to the invention, a method for assembling the electric machine according to the invention is additionally provided, wherein the method comprises the steps: inserting the rotor in the stator housing; fitting the outer circumferential contour of the end plate into the inner circumference of the stator housing, so that the magnetic bearing and the inner ring of the radial bearing each enclose the rotor shaft; operating the electric machine so that its rotor with energized magnetic bearing rotates; determining a vibration behavior of the rotor, determining a correction offset from the vibration behavior, changing the respective protruding amounts of the support elements based on the correction offset. Changing the respective protruding amounts in this case is effected such that the vibration behavior of the electric machine is optimized. This is effected by making the axis of rotation of the rotor shaft of the electric machine and the geometrical longitudinal axis and/or the magnetic longitudinal axis of the stator of the electric machine coincide.

Through the method according to the invention the possibility is utilized in particular of realizing fine adjustments of the rotor with respect to the magnetic central axis or longitudinal axis of the stator winding based on an achieved operating behavior or vibration behavior, by way of which electrical asymmetries can be corrected. Determining the correction offset of the axis of rotation of the rotor shaft with respect to the central axis of the stator winding of the spacer and the corresponding changing of the respective protruding amounts of the support elements is effected either by way of tests or multiple assembly and measurement iterations or by calculation based on achieved operating behaviour.

The invention expressly extends also to such embodiments as are not provided by feature combinations from explicit references to the claims, so that the disclosed features of the invention—as far as technically practical—can be combined with one another as required.

In an electric machine according to the invention according to a second aspect of the invention, the support elements or shimming pads are not accommodated in the end plate but in the stator housing and/or in the connecting housing and contact the end plate.

BRIEF DESCRIPTION OF THE DRAWINGS

In the following, the invention is described in more detail with the help of a preferred embodiment and making reference to the attached figures, in which.

DETAILED DESCRIPTION OF THE PREFERRED EMBODIMENTS

Figure 1:
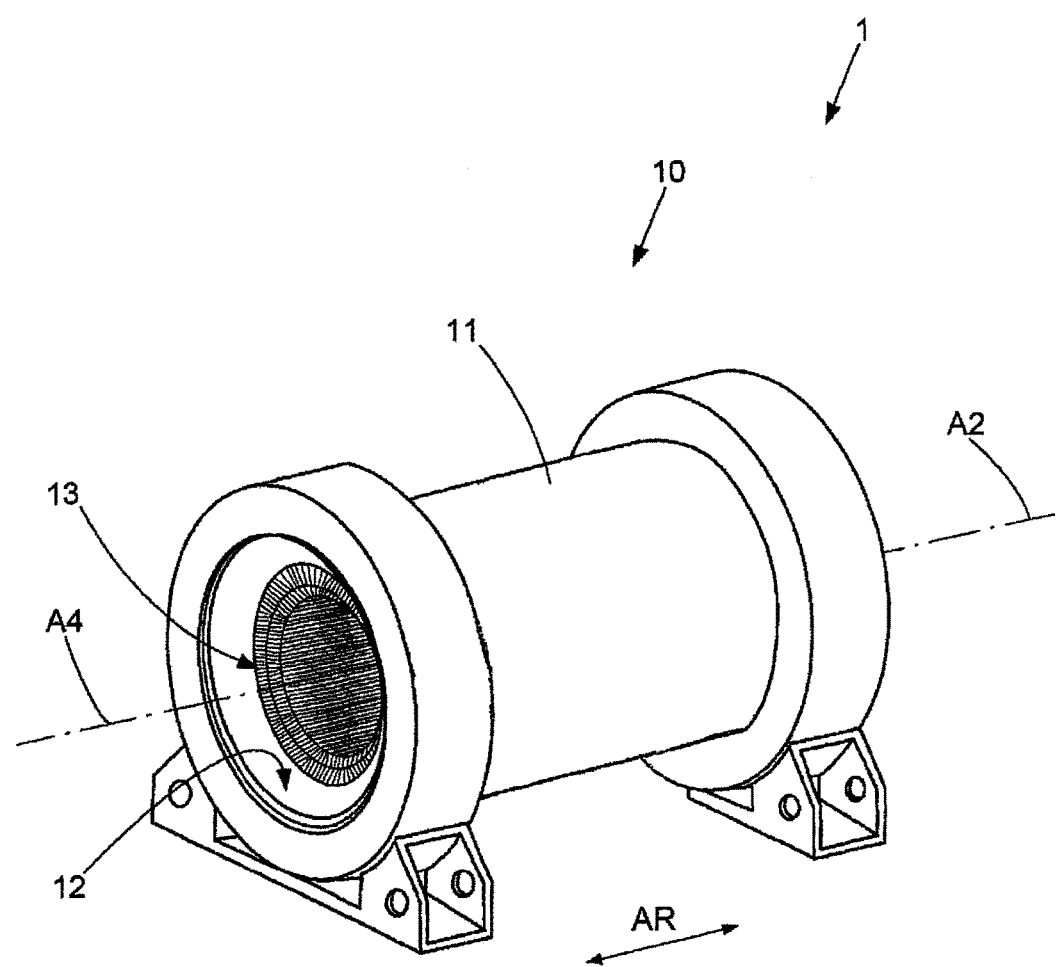
FIG. 1 shows a perspective view of a stator of an electric machine according to an embodiment of the invention according to the first aspect of the invention.
Figure 2:
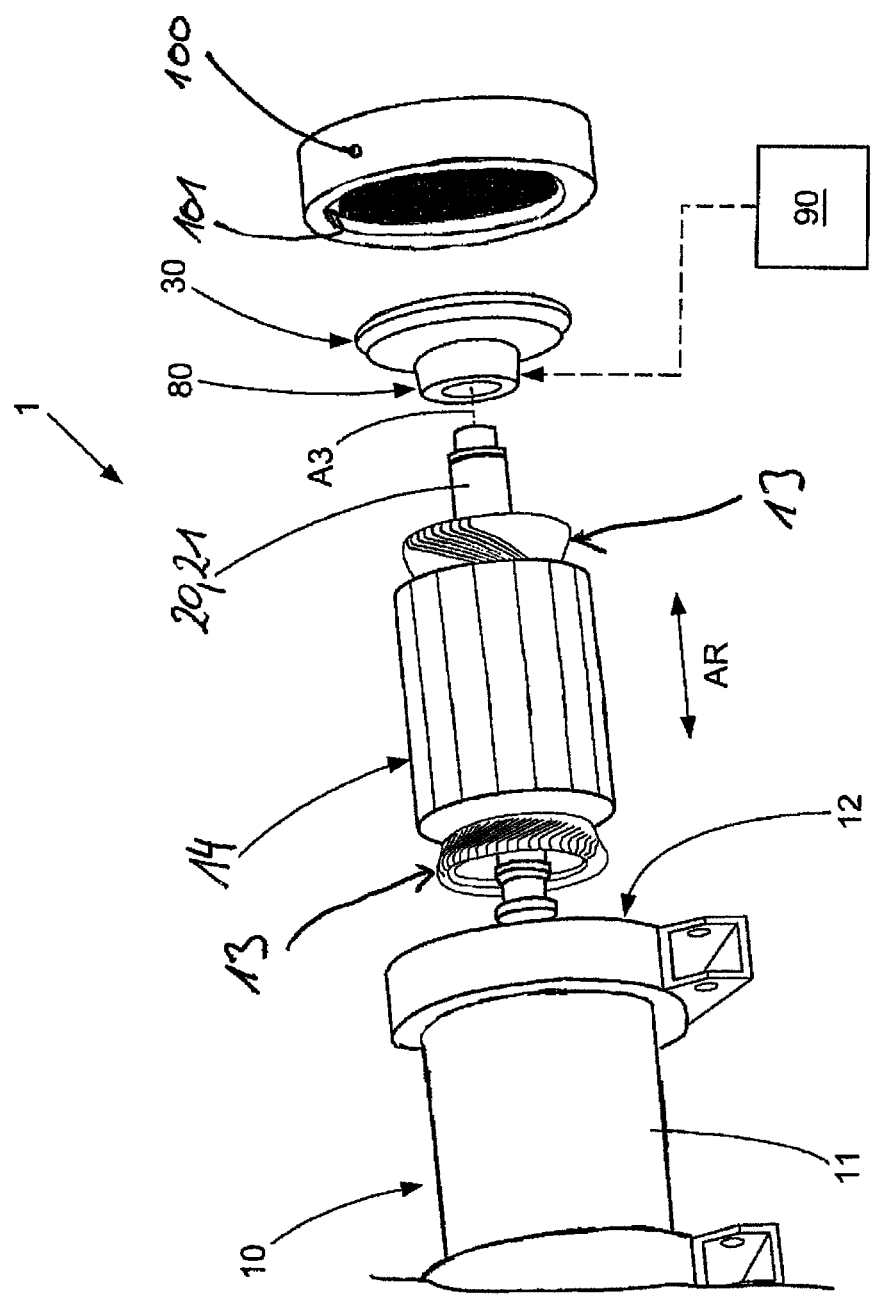
FIG. 2 shows a perspective exploded view of the electric machine of FIG. 1.
Figure 3:
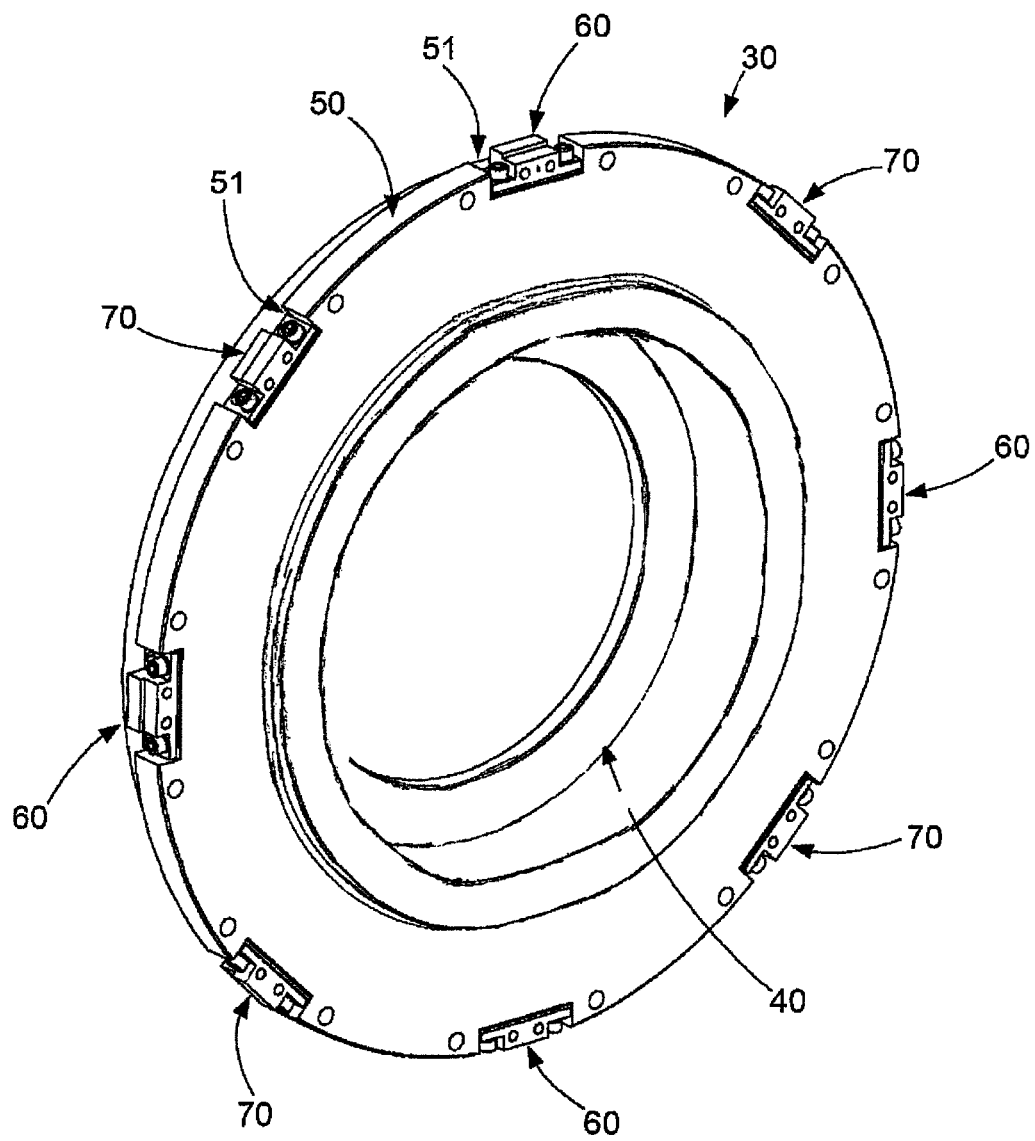
FIG. 3 shows a perspective view of an end plate of the electric machine of FIG. 1.
Figure 4:
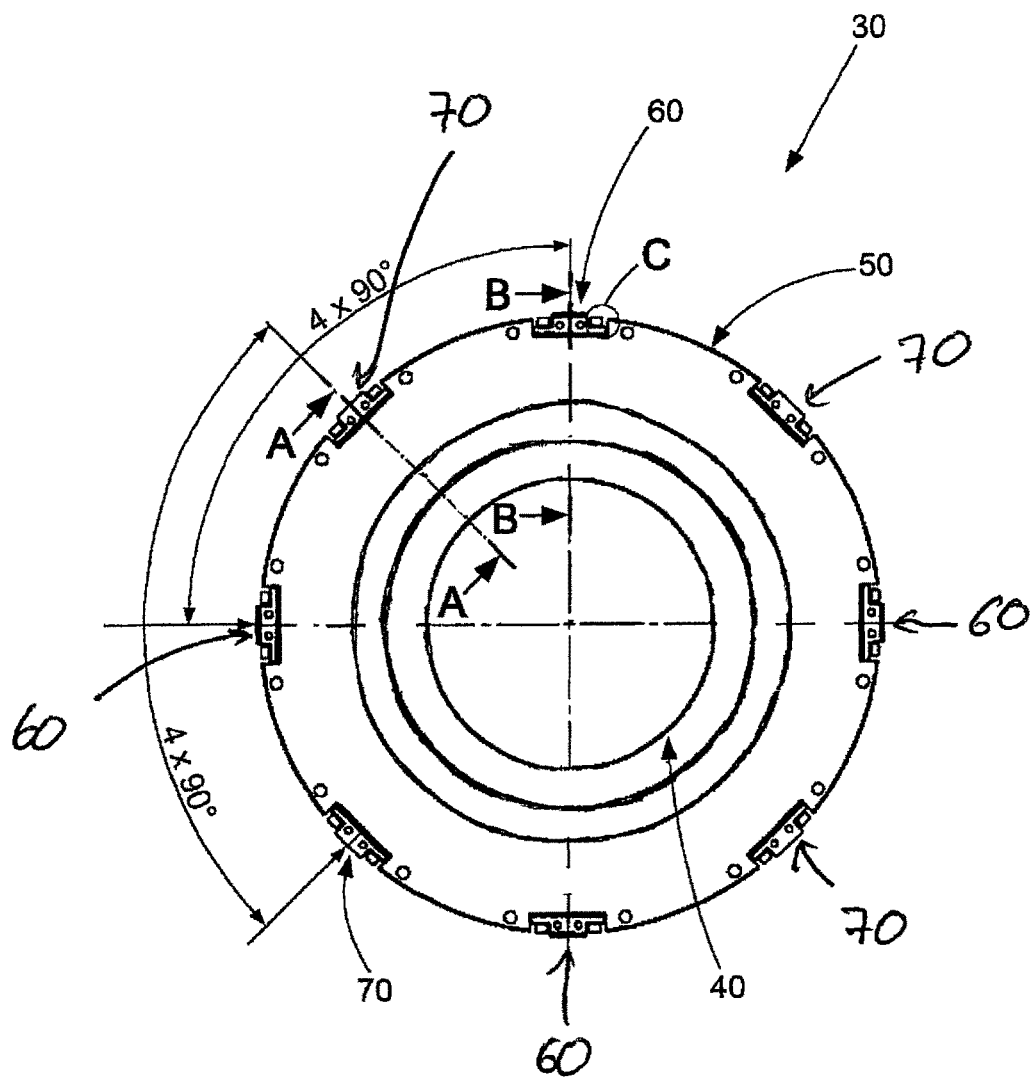
FIG. 4 shows a view in axial direction of the end plate of FIG. 3.
Figure 5A:
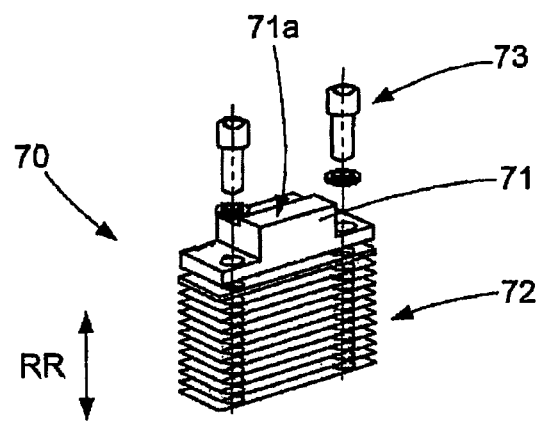
FIG. 5A shows a perspective view of a support element of the end plate of FIG. 3 belonging to a group.
Figure 5B:
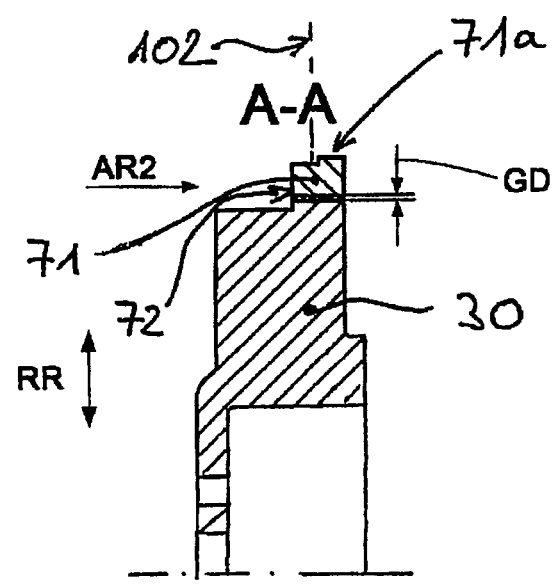
FIG. 5B is a sectional view of a part of the end plate viewed along a line A-A in FIG. 4.
Figure 6A:
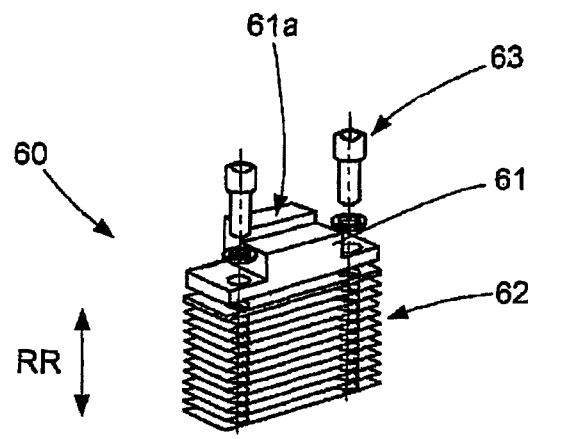
FIG. 6A shows a perspective view of a support element of the end plate of FIG. 3 belonging to a further group.
Figure 6B:
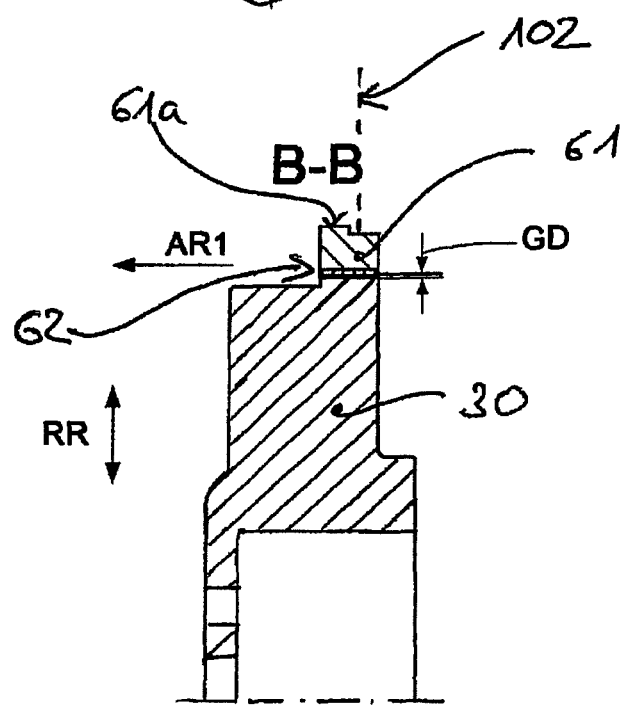
FIG. 6B is a sectional view of a part of the end plate viewed along a line B-B in FIG. 4.
Figure 7:
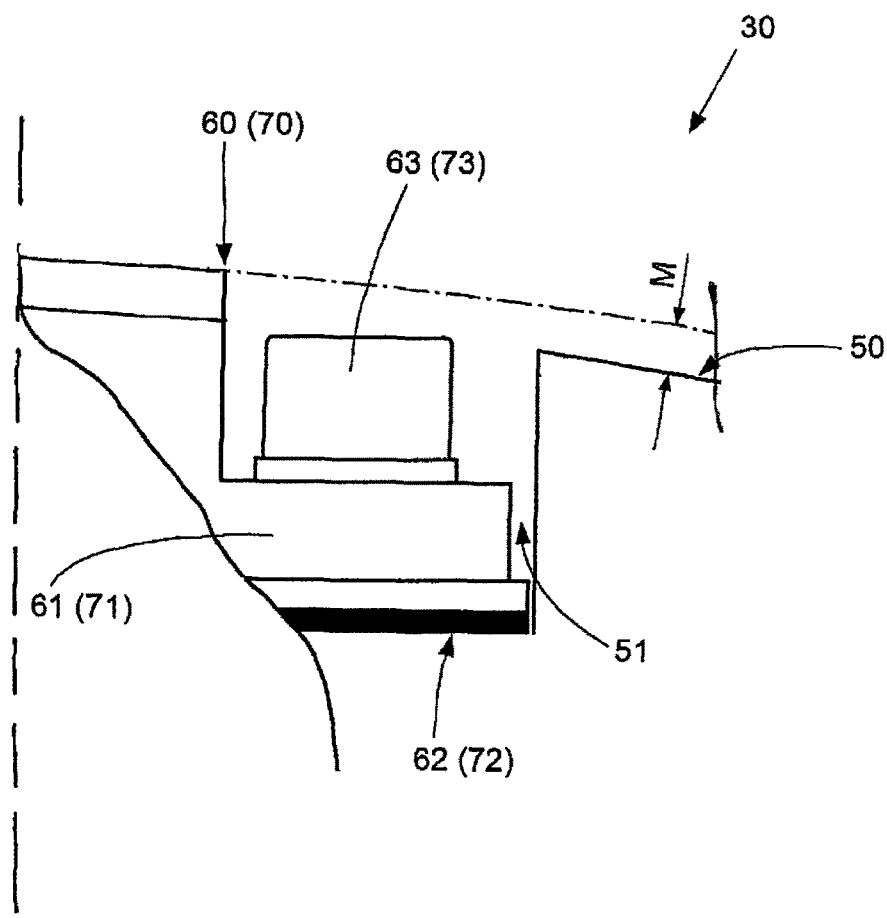
FIG. 7 shows an enlarged view of a region C of FIG. 4.

FIGS. 1 and 2 show an electric machine 1 according to an embodiment of the invention. The electric machine 1 is preferably formed as an electric motor or as an electric generator.

The electric machine 1 is provided with a stator 10 comprising a stator housing 11 and a stator laminated core 14, a rotor 20 arranged in an inner circumference 12 of the stator housing 11 with a rotor shaft 21 and on each of two ends in an axial direction AR of the electric machine 1 an end plate 30 each, wherein in FIG. 2 only one end plate 30 is visible.

As is additionally evident from the FIGS. 3 to 7, each end plate 30 comprises a bearing receptacle 40 and a circumferential contour 50 radially pointing outwards.

In the bearing receptacle 40 of the end plate 30 a bearing in the form of a magnetic bearing 80 equipped for rotatably mounting the rotor 20 is accommodated. The magnetic bearing 80 can be a passive magnetic bearing or an active magnetic bearing. Preferentially, an active magnetic bearing 80 is employed.

Figure 10:
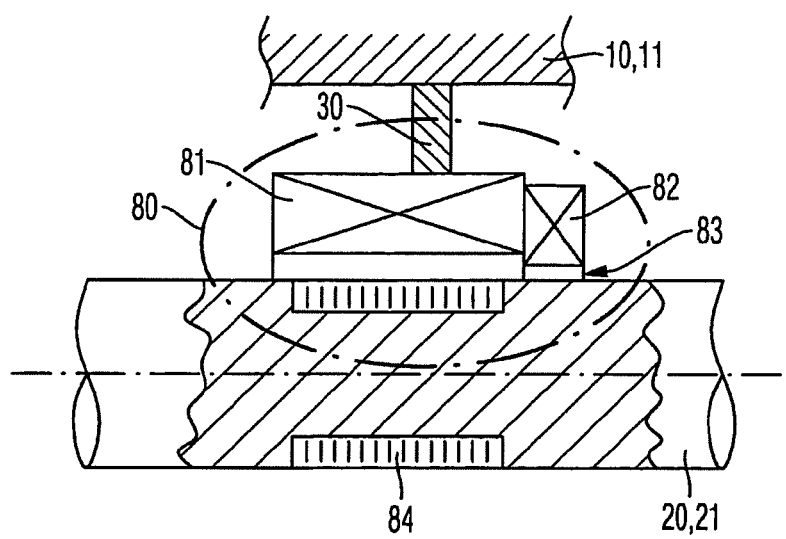
FIG. 10. shows a schematic cross section through an electric machine 1 in the region of an active magnetic bearing 80.

FIG. 10 shows a schematic cross section through an electric machine 1 in the region of an active magnetic bearing 80. In addition to the active part 81 of the magnetic bearing 80 on the stator side, which interacts with a laminated core 84 of the magnetic bearing 80 on the rotor side, the active magnetic bearing 80 comprises a catch bearing 82 on the stator side in order to be able to catch the rotor 20 in the event of a failure of the magnetic bearing. The catch bearing 82 can be configured as a roller bearing or sliding bearing.

The reference number 83 marks a gap in the region of the catch bearing 82, which defines the smallest radial play of the magnetic bearing 80.

The active magnetic bearing 80 is electrically activated by a preferably electronic control device 90.

On the circumferential contour 50, a number of at least three—in the shown embodiment two groups of four support elements 60, 70 each—are provided, each of which radially protrudes over the circumferential contour 50 by a certain protruding amount M (see FIG. 7), so that they define a discontinuous outer circumferential contour of the end plate 30. As is evident from FIG. 4, the support elements 60, 70 in the shown embodiment are arranged symmetrically to one another by a respective angular spacing of 45 degrees distributed about the circumferential contour 50.

The respective protruding amounts M of the support elements 60, 70 are dimensioned so that the outer circumferential contour formed by these can be fitted in or is fitted in for radially supporting the end plate 30 by making a center of the magnetic bearing 80 coincide with a geometrical longitudinal axis A2 of the stator 10 of the electric machine 1 and/or of a magnetic longitudinal axis A4 of the stator 10 of the electric machine 1.

The catch bearing of an active magnetic bearing 80 comprises an inner ring, which encloses the rotor shaft 21 and which has an inner diameter that is greater by a predetermined dimension than an outer diameter of the rotor shaft 21, so that with energized magnetic bearing 80 the annular gap 83 between rotor shaft 21 and inner ring is formed and with non-energized magnetic bearing 80 the rotor shaft 21 rests on the inner ring on the inside.

The control device 90 activates an active magnetic bearing 80 so that with energized magnetic bearing 80 an axis of rotation A3 of the rotor shaft 21 is made to coincide with the axis of rotation of the magnetic bearing and indirectly of the catch bearing.

The support elements 60, 70 are each radially adjustably mounted to the circumferential contour 50, so that the respective protruding amounts M of the support elements 60, can be changed to make the center of the magnetic bearing 80 coincide with the geometrical longitudinal axis A2 and/or the magnetic longitudinal axis A4 of the stator 10 of the electric machine 1.

As is evident from FIGS. 5A and 5B, and FIGS. 6A and 6B, each support element 60, 70 for realizing the adjustability, comprises a contact body 61, 71 located radially outside for contacting the inner circumference 12 of the stator housing 11 and an individual number of shims 62, 72 shimmed under the contact body 61, 71 radially to the inside, wherein contact body 61, 71 and shims 62, 72 are detachably fastened to the end plate 30 by screws 63, 73.

The support elements 60, 70, are arranged in respective recesses 51 in the end plate 30, each of which extend from the circumferential contour 50 radially to the inside and circumferentially of the end plate 30, so that the screw heads of the screws 63, 73 do not protrude radially over the circumferential contour 50.

Each shim 62, 72 has a certain thickness dimension in a radial direction RR. In the shown embodiment of the invention, for example four shims 62, 72 with a radial thickness dimension of 0.15 mm and seven shims 62, 72 with a radial thickness dimension of 0.20 mm as nominal assembly are stacked onto one another into a stack with a radial overall thickness dimension GD of 2 mm.

Accordingly, the protruding amounts M which at the start of the adjusting process are still identical according to an embodiment of the invention in each case amount to for example 4 mm.

For changing the respective protruding amounts M (e.g., analogously to the above exemplary dimensions in a range from 2 mm to 6 mm) of the support elements 60, 70 so that with assembled end plate 30 the center of the magnetic bearing 80 coincides with the geometrical longitudinal axis A2 and/or the magnetic longitudinal axis A4 of the stator 10 of the electric machine 1, simply one or multiple shims 62, 72 have to be removed or added in one or multiple adjusting steps corresponding to recorded measurement values. Accordingly, an envelope circle surrounding the support elements 60, 70 is geometrically shifted relative to the axis of rotation or the center of the magnetic bearing 80 accommodated in the end plate 30, so that with the end plate 30 inserted in the stator housing 11 the axis of rotation of the magnetic bearing 80 and thus the center of the magnetic bearing 80 is shifted relative to the geometrical longitudinal axis A2 and/or to the magnetic longitudinal axis A4 of the stator 10 of the electric machine 1 to attain coincidence.

The support elements 60, 70 are arranged in two groups of support elements distributed about the circumferential contour 50. The support elements of a first group of these two groups are in engagement with the inner circumference 12 of the stator housing 11, in order to fit in the end plate 30 with respect to the stator housing 11. The support elements of a second group of these two groups are in engagement with the inner circumference 101 of a connecting housing 100 in order to fit in the connecting housing 100 with respect to the stator housing 11 independently of the end plate 30.

The connecting housing 100 can be a connecting housing of the electric machine 1 or a stator housing of a further machine.

Accordingly, the longitudinal axis of the connecting housing 100 can be aligned with respect to the longitudinal axis of the stator 10 of the electric machine 1, without the coincidence of the center of the magnetic bearing 80 with the geometrical longitudinal axis A2 of the stator 10 of the electric machine 1 and/or of the magnetic longitudinal axis A4 of the stator 10 of the electric machine 1 having to be changed.

Assuming that in FIGS. 5A, 5B, 6A and 6B the stator housing 11 of the electric machine 1 is positioned on the right and the connecting housing 101 on the left of the separating plane 102 between stator housing 11 and connecting housing 101, the support elements 70 serve for aligning the end plate 30 relative to the stator housing 11 and the support elements 60 for the independent alignment of the inner circumference of the connecting housing 101 relative to the stator housing 11.

The support elements 60, 70 each comprise a support surface 61a, 71a located radially on the outside, which are formed stepped axially with respect to the end plate 30, wherein the stepping of the first group with at least three support elements 60 radially rises in a first axial direction AR1 as far as to the respective protruding amount M and the stepping of the second group with at least three support elements 70 radially rises in a second axial direction AR2 as far as to the respective protruding amount M, and wherein within each of the two groups the support elements 60, 70 are arranged with a defined angular spacing from one another distributed about the circumferential contour 50.

In each of the two groups, the support elements 60, 70 are preferentially arranged distributed symmetrically about the circumferential contour 50 of the end plate 30.

In the illustrated exemplary embodiment, each of the two groups comprises four support elements 60, 70 each, wherein within each of the two groups of four the support elements 60, 70 are arranged with a respective angular spacing of 90 degrees relative to one another symmetrically distributed about the circumferential contour 50.

Method steps according to the invention for assembling the electric machine 1 are described in the following.

Initially, in a first method according to the invention, the center or the axis of rotation A1 of each magnetic bearing, and thus also the center of each magnetic bearing 80, is adjusted or made to coincide in a first approximation via the alignment according to the inner circumference or inner diameter 12 of the stator housing 11 with the magnetic central axis A4 of a stator winding 13 of the stator 10.

According to an embodiment of the invention, this is realized with the following method steps to be carried out one after the other:

Determining the position of the geometrical longitudinal axis A2 of the inner circumference 12 of the stator housing by measuring (e.g., by a 3D coordinate measurement machine) the inner circumference 12 of the stator housing 11. Fitting the outer circumferential contour of the end plate 30 into the inner circumference 12 of the stator housing 11 in the sense of rough adjustment. In this regard: determining the position of the center of the magnetic bearing 80 relative to the position of the geometrical longitudinal axis A2 of the inner circumference of the stator housing 11 by measuring the bearing receptacle 40 of the end plate 30. Subsequent determining of an offset amount of the center of the magnetic bearing 80 with respect to the geometrical longitudinal axis A2 of the inner circumference 12 of the stator housing 11 from measurement data obtained during measuring. Disassembling the end plate 30 from the stator housing 11 and changing the respective protruding amounts M of the support elements 60, 70 by the offset amount.

Optional further fitting of the outer circumferential contour of the end plate 30 into the inner circumference 12 of the stator housing 11 in the sense of fine adjustment. In this regard: determining the position of the center of the magnetic bearing 80 relative to the position of the geometrical longitudinal axis A2 of the inner circumference of the stator housing 11 by measuring the bearing receptacle 40 of the end plate 30. In the case of active magnetic bearings 80, this is preferentially performed by determining the center of the inner diameter of the catch bearing 82. Subsequent determining of an updated offset amount of the center of the magnetic bearing 80 with respect to the geometrical longitudinal axis A2 of the inner circumference 12 of the stator housing 11 from measurement data obtained during measuring. Should the updated offset amount be greater than a tolerable offset amount, the method steps starting with disassembling the end plate 30 have to be repeated.

Thereafter, when utilizing active magnetic bearings, this can be followed by a further method according to the invention with which the opportunity of realizing adjustments of the rotor 20 relative to the magnetic central axis A4 of the stator winding 13 of the stator 10 based on an achieved operating behavior or vibration behavior is additionally taken, by way of which electric asymmetries can be corrected. According to an embodiment of the invention, this is realized for example by the following method steps:

Inserting the rotor 20 in the stator housing 11; fitting the outer circumferential contour of the end plate 30 into the inner circumference 12 of the stator housing 11, wherein the magnetic bearing 80 and the inner ring of the catch bearing 82 each enclose the rotor shaft 21; operating the electric machine 1 so that its rotor 20 with energized magnetic bearing 80 rotates; determining a vibration behavior of the rotor 20; determining a correction offset with respect to the stator 10 from the vibration behavior; disassembling the end plate 30 from the stator housing 11; changing the respective protruding amounts M of the support elements 60, 70 by the correction offset; fitting the outer circumferential contour of the end plate 30 into the inner circumference 12 of the stator housing 11; operating the electric machine 1 so that its rotor 20 with energized magnetic bearing 80 rotates; determining an updated vibration behaviour of the rotor 20. With still inadequate vibration behaviour, determining an updated correction offset with respect to the stator 10 from the updated vibration behaviour. Should the updated correction offset be greater than a tolerable correction offset, the method steps starting with disassembling the end plate 30 must be repeated. Determining the correction offset and the corresponding changing of the respective protruding amounts M of the support elements 60, 70 by the correction offset are preferably effected by way of tests or multiple assembly and measurement iterations until the desired vibration behaviour is attained. Determining the vibration behavior is effected for example by test equipment configured with electronic evaluation and display equipment similar to a balancing machine.

Figure 8A:
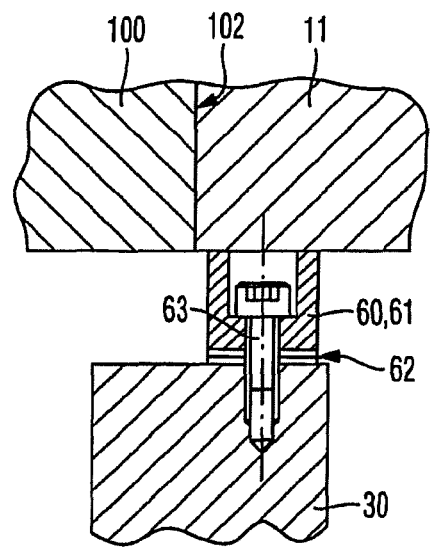
FIGS. 8A and 8B show alternatives to the support elements of FIGS. 5 and 6.
Figure 8B:
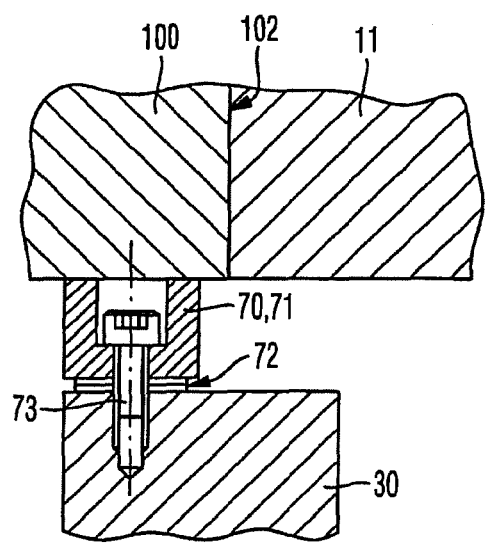

As is evident from FIGS. 8A and 8B, the support elements 60, 70 in contrast with FIGS. 5A and 5B, and FIGS. 6A and 6B, need not comprise stepped support surfaces 61a, 71a. It is sufficient that the support elements 60, 70 of the two groups are embodied so that the same are each in engagement with one of the housings, i.e., stator housing 11 or connecting housing 100. The longitudinal axis of the connecting housing 100 can also be independently aligned in this way with respect to the longitudinal axis of the stator 10 of the electric machine 1 without the coincidence of the center of the magnetic bearing 80 with the geometrical longitudinal axis A2 of the stator 10 of the electric machine 1 and/or of the magnetic longitudinal axis A4 of the stator 10 of the electric machine 1 having to be changed.

Figure 9A:
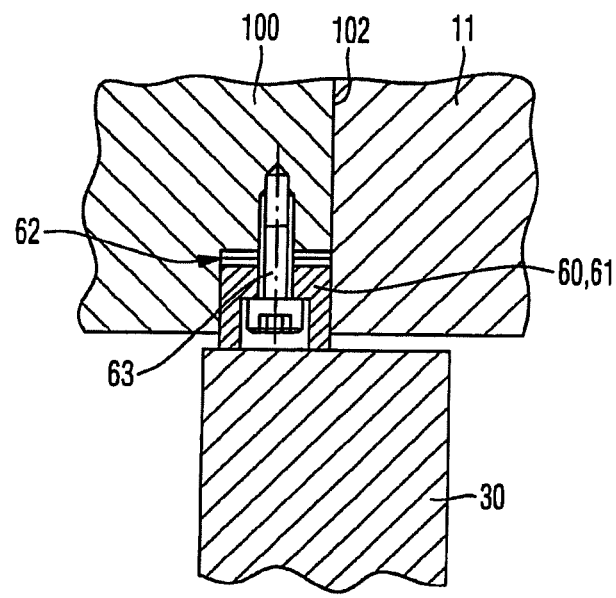
FIGS. 9A and 9B schematically show details of cross sections of an electric machine according to the second aspect of the invention.
Figure 9B:
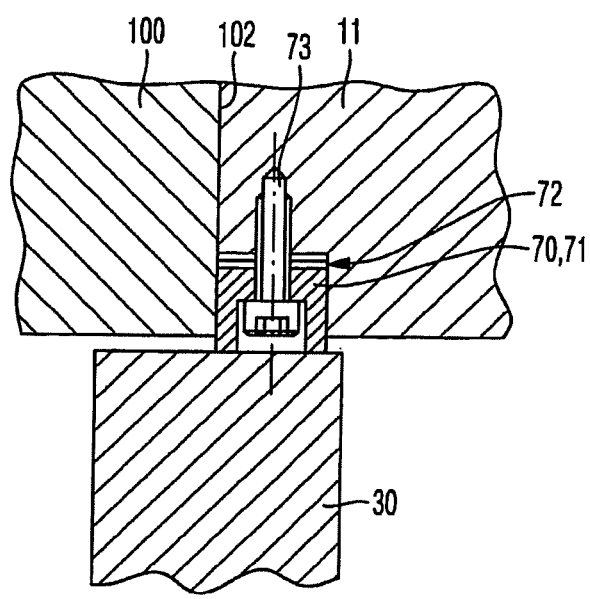

In FIG. 1 to FIG. 8B the support elements 60, 70 are accommodated in the end plate 30. In contrast with this, FIGS. 9A and 9B show an embodiment of an electric machine 1 according to a second aspect of the invention, in which the support elements 60, 70 are accommodated in the stator housing 11 or in the connecting housing 100 and contact the end plate 30 in order to fit in the end plate 30 while making the center of the magnetic bearing 80 coincide with the geometrical longitudinal axis A2 of the electric machine 1 and/or the magnetic longitudinal axis A4 of the electric machine 1. In the version of FIGS. 9A and 9B, a number of at least three support elements 60, 70 are provided on a radially inner circumferential contour of the stator housing 11 of the electric machine 1 and of the connecting housing 100, each of which radially protrude to the inside by a certain protruding amount M with respect to the respective circumferential contour, so that they define a discontinuous inner circumferential contour of the stator housing 11 and/or of the connecting housing 100. The respective protruding amounts are dimensioned so that the end plate 30 can be fitted in subject to making a center of the magnetic bearing 80 coincide with a geometrical longitudinal axis A2 of the electric machine 1 and/or a magnetic longitudinal axis A4 of the electric machine 1.

The support elements 60, 70 are each mounted radially adjustably to the respective circumferential contour so that the respective protruding amounts M of the support elements 60, 70 are adjustable. Each support element 60, 70 preferentially comprises a contact body 61, 71 located radially inside for contacting an outer circumference of the end plate 30 and an individual number of shims 62, 72 shimmed under the support body 61, 71 radially to the outside, wherein each shim 62, 72 has a certain radial thickness dimension. The support elements 60, 70 are arranged in respective recesses of the stator housing 11 and of the connecting housing 100, each of which extend from the respective circumferential contour radially to the outside and circumferentially of the stator housing 11 and/or of the connecting housing 100.

The support elements 60, 70 are preferentially arranged in two groups of support elements distributed about the circumferential contour of the stator housing 11 and/or of the connecting housing 100, wherein the support elements of a first group of these two groups fit in the end plate 30 with respect to the stator housing 11, and wherein the support elements of a second group of these two groups fit in the connecting housing 100 with respect to the stator housing 11 independently of the end plate 30.

The methods described above can be employed analogously to the electric machine of FIGS. 9A and 9B. To avoid unnecessary repetitions, reference, with respect to the methods and the details of passive or active magnetic bearings, is made to the explanations regarding the electric machine of FIG. 1 to FIGS. 7, 8A and 8B.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An end plate (30) for an electric machine (1), the end plate comprising:
a magnetic bearing (80) configured to rotatably mount a rotor (20) of the electric machine (1);
a bearing receptacle (40), configured to accommodate the magnetic bearing (80) therewithin; and
a radially outer circumferential contour (50), on which at least three support elements (60, 70) are provided, each of which protrudes radially outside, with respect to the circumferential contour (50), by a protruding amount (M) so as to define a discontinuous outer circumferential contour of the end plate (30), the at least three support elements (60, 70) being detachably fastened to the end plate (30) by fasteners (63, 73), the fasteners (63, 73) being arranged so as to be circumferentially orientated along the circumferential contour of the end plate (30),
wherein the respective protruding amounts (M) of the at least three support elements (60, 70) are dimensioned so that the end plate (30) is fitted in by making a center of the magnetic bearing (80) coincide with at least one of a geometrical longitudinal axis (A2) of the electric machine (1) and a magnetic longitudinal axis (A4) of the electric machine (1),
wherein the electric machine (1) comprises a stator (10) having a stator housing (11) having an inner circumference (12), and wherein the support elements (60, 70) are arranged in two groups of support elements distributed about the circumferential contour (50), wherein the support elements of a first group of the two groups are in engagement with the inner circumference (12) of the stator housing (11) so as to fit in the end plate (30) with respect to the stator housing (11), and wherein the support elements of a second group of the two groups are in engagement with an inner circumference (101) of a connecting housing (100) so as to fit in the connecting housing (100) with respect to the stator housing (11) independently of the end plate (30), and
wherein the support elements (60, 70) each have a support surface (61a, 71a) located radially at the outermost side of the respective support elements, which are formed stepped axially of the end plate (30), wherein the stepping of the first group with at least three support elements (60) radially rises in a first axial direction (AR1), perpendicular to the circumferential orientation of the fasteners (63) for the first group, as far as to the respective protruding amount (M) and the stepping of the second group with at least three support elements (70) radially rises in a second axial direction (AR2), perpendicular to the circumferential orientation of the fasteners (73) for the second group, as far as to the respective protruding amount (M), and wherein within each of the two groups the support elements (60, 70) are arranged with a defined angular spacing from one another distributed about the circumferential contour (50).

2. The end plate (30) according to claim 1, wherein the support elements (60, 70) are each mounted radially adjustably on the circumferential contour (50) so that the respective protruding amounts (M) of the support elements (60, 70) are adjustable.

3. The end plate (30) according to claim 1, wherein each support element (60, 70) comprises: a contact body (61, 71) located radially to the outside and configured to contact an inner circumference (12) of the stator housing (11), and an individual number of shims (62, 72) shimmed under the contact body (61, 71) radially to the inside, each shim (62, 72) having a specific radial thickness dimension.

4. The end plate (30) according to claim 1, further comprising respective recesses (51), each of which extends from the circumferential contour (50) radially to the inside and circumferentially of the end plate (30), wherein the support elements (60, 70) are arranged in the respective recesses (51).

5. The end plate (30) according to claim 1, wherein within each of the two groups the support elements (60, 70) are configured so as to be symmetrically distributed about the circumferential contour (50).

6. An electric machine (1) comprising:
a stator (10) having a stator housing (11);
a rotor (20) arranged in an inner circumference (12) of the stator housing (11); and
an end plate (30) according to claim 1,
wherein for rotatably mounting the rotor (20), the magnetic bearing (80) is received in the bearing receptacle (40) of the end plate (30), and for radially supporting the end plate (30) the outer circumferential contour is fitted into the inner circumference (12) of the stator housing (11) such that the center of the magnetic bearing (80) is fitted in with at least one of a geometrical longitudinal axis (A2) of the electric machine (1) and a magnetic longitudinal axis (A4) of the electric machine (1).

7. The electric machine (1) according to claim 6, wherein the rotor (20) comprises a rotor shaft (21), and wherein the magnetic bearing (80) has an active magnetic bearing with a catch bearing, having an inner ring, which encloses the rotor shaft (21) and which has an inner diameter that is greater by a predetermined dimension than an outer diameter of the rotor shaft (21), so that in the case of an energized magnetic bearing (80) an annular gap between the rotor shaft (21) and the inner ring of the catch bearing is formed and in the case of a non-energized magnetic bearing (80) the rotor shaft (21) rests on an inside of the inner ring.

8. The electric machine (1) according to claim 7, further comprising a control device (90) configured to electrically activate the magnetic bearing (80), so that in the case of an energized magnetic bearing (80) an axis of rotation of the rotor shaft (21) coincides with the center (A1) of the magnetic bearing.

9. A method for assembling an electric machine (1) according to claim 7, the method comprising:
- inserting the rotor (20) in the stator housing (11);
- fitting the outer circumferential contour of the end plate (30) into the inner circumference (12) of the stator housing (11), so that the magnetic bearing (80) and the inner ring of the catch bearing enclose the rotor shaft (21);
- operating the electric machine (1) so that its rotor (20) with an energized magnetic bearing (80) rotates;
- determining a vibration behavior of the rotor (20);
- determining a correction offset from the vibration behavior; and
- changing the respective protruding amounts (M) of the support elements (60, 70) based on the correction offset.

* * * * *